(12) United States Patent
Brown

(10) Patent No.: US 7,472,829 B2
(45) Date of Patent: Jan. 6, 2009

(54) PAYMENT CARD WITH INTERNALLY GENERATED VIRTUAL ACCOUNT NUMBERS FOR ITS MAGNETIC STRIPE ENCODER AND USER DISPLAY

(75) Inventor: Kerry Dennis Brown, Portola Valley, CA (US)

(73) Assignee: Qsecure, Inc., Los Altos, CA (US)

( * ) Notice: Subject to any disclaimer, the term of this patent is extended or adjusted under 35 U.S.C. 154(b) by 497 days.

(21) Appl. No.: 11/297,014

(22) Filed: Dec. 8, 2005

(65) Prior Publication Data

US 2006/0124756 A1    Jun. 15, 2006

Related U.S. Application Data

(60) Provisional application No. 60/634,829, filed on Dec. 10, 2004.

(51) Int. Cl.
*G06K 7/01* (2006.01)
(52) U.S. Cl. .............. 235/382.5; 235/380; 235/492; 235/493; 235/449; 235/494; 705/41; 705/44; 705/65; 705/66; 705/67
(58) Field of Classification Search ........... 235/380, 235/492, 382.5, 493, 449; 705/41, 44, 65–67
See application file for complete search history.

(56) References Cited

U.S. PATENT DOCUMENTS

| | | | | | |
|---|---|---|---|---|---|
| 4,791,283 | A | * | 12/1988 | Burkhardt | 235/438 |
| 5,317,636 | A | * | 5/1994 | Vizcaino | 705/65 |
| 5,559,315 | A | * | 9/1996 | Nair et al. | 235/448 |
| 5,623,552 | A | * | 4/1997 | Lane | 382/124 |
| 5,627,355 | A | * | 5/1997 | Rahman et al. | 235/380 |
| 5,955,961 | A | * | 9/1999 | Wallerstein | 340/5.4 |
| 6,163,771 | A | * | 12/2000 | Walker et al. | 705/18 |
| 6,308,890 | B1 | * | 10/2001 | Cooper | 235/449 |
| 6,609,654 | B1 | * | 8/2003 | Anderson et al. | 235/379 |
| 6,764,005 | B2 | * | 7/2004 | Cooper | 235/449 |
| 6,853,412 | B2 | * | 2/2005 | Stephenson | 349/86 |
| 7,051,929 | B2 | * | 5/2006 | Li | 235/380 |
| 7,357,331 | B2 | * | 4/2008 | Blossom | 235/492 |
| 2003/0057278 | A1 | * | 3/2003 | Wong | 235/451 |
| 2004/0034782 | A1 | * | 2/2004 | Park | 713/185 |

* cited by examiner

*Primary Examiner*—Michael G Lee
*Assistant Examiner*—Kristy A Haupt
(74) *Attorney, Agent, or Firm*—Richard B. Main

(57) ABSTRACT

A payment card comprises an internal virtual account number generator and a user display for online transactions. Offline transactions with merchant card readers are enabled by a magnetic array positioned behind the card's magnetic stripe on the back. The internal virtual account number generator is able to program the magnetic bits encoded in the magnetic stripe to reflect the latest virtual account number. The internal virtual account number generator produces a sequence of virtual numbers that can be predicted and approved by the issuing bank. Once a number is used, it is discarded and put on an exclusion list.

10 Claims, 9 Drawing Sheets

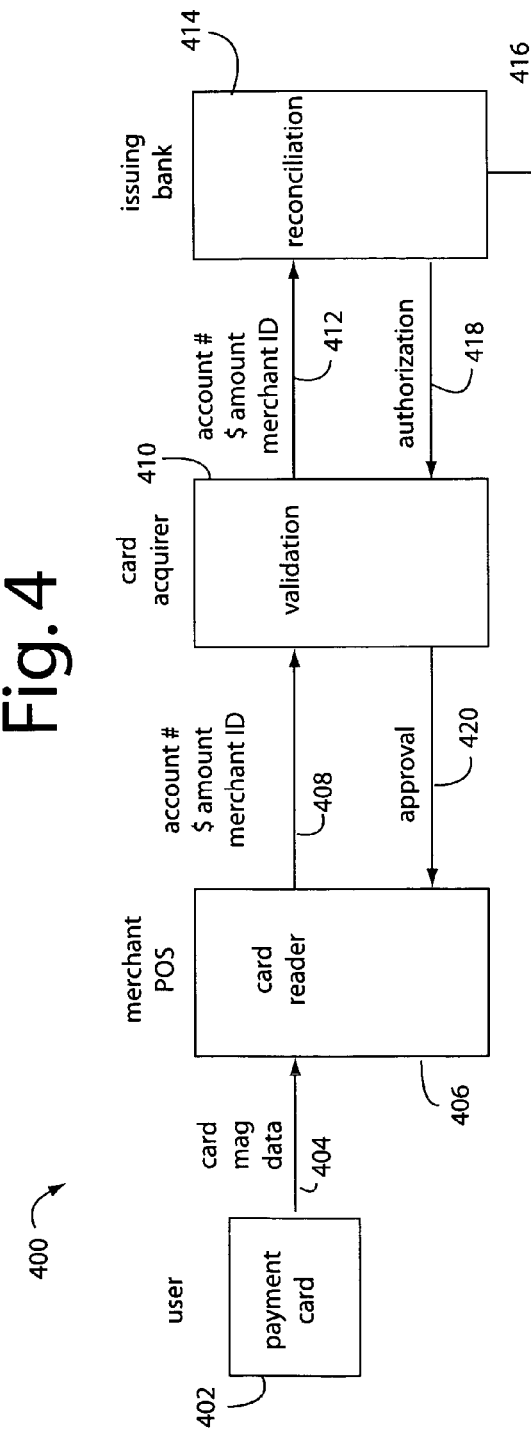
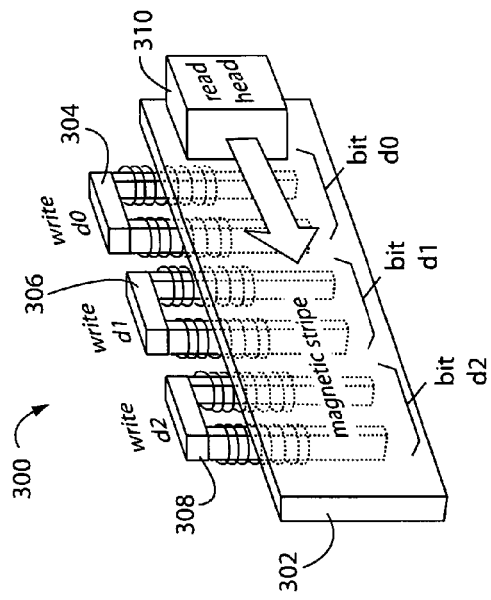

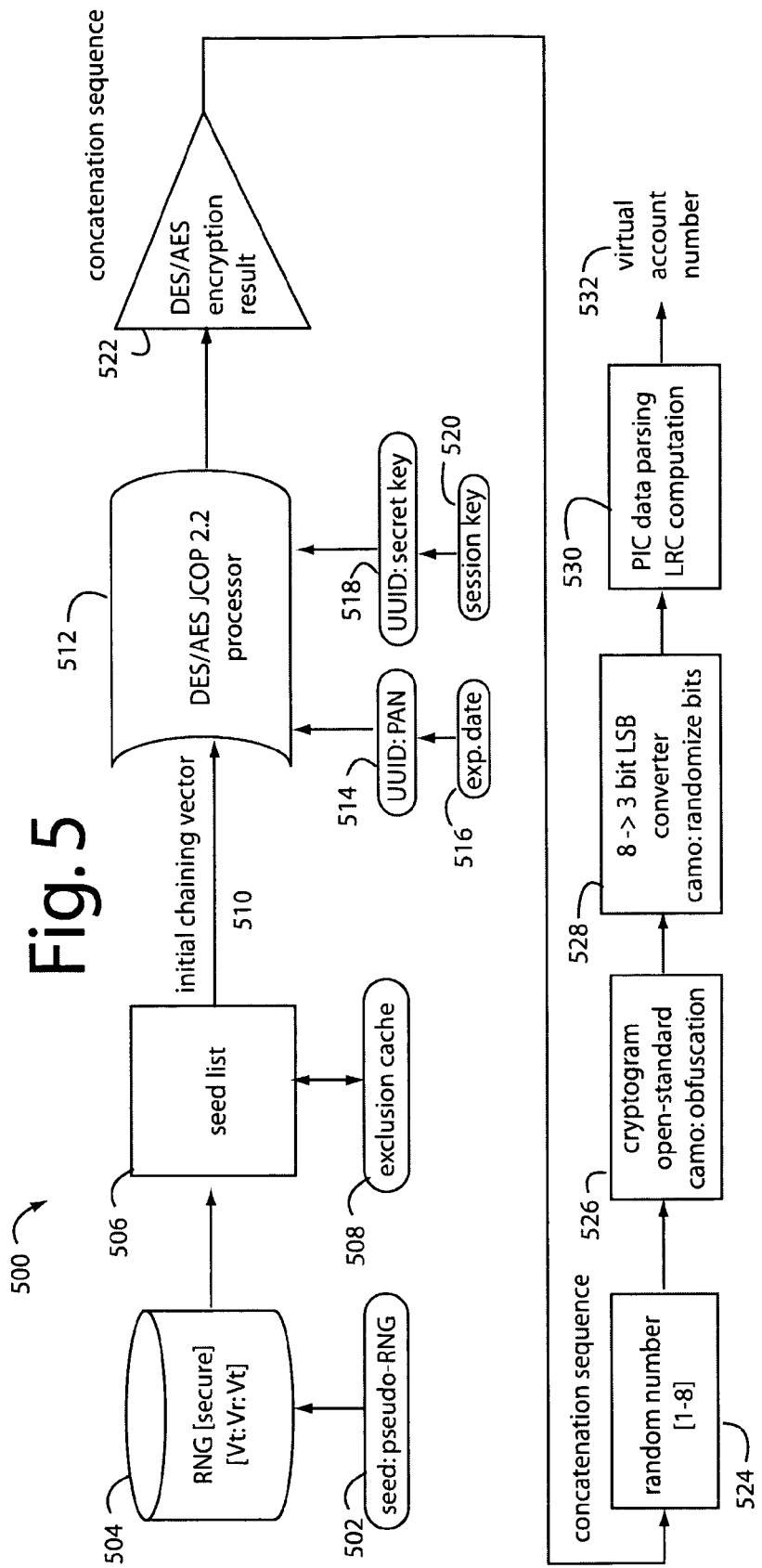

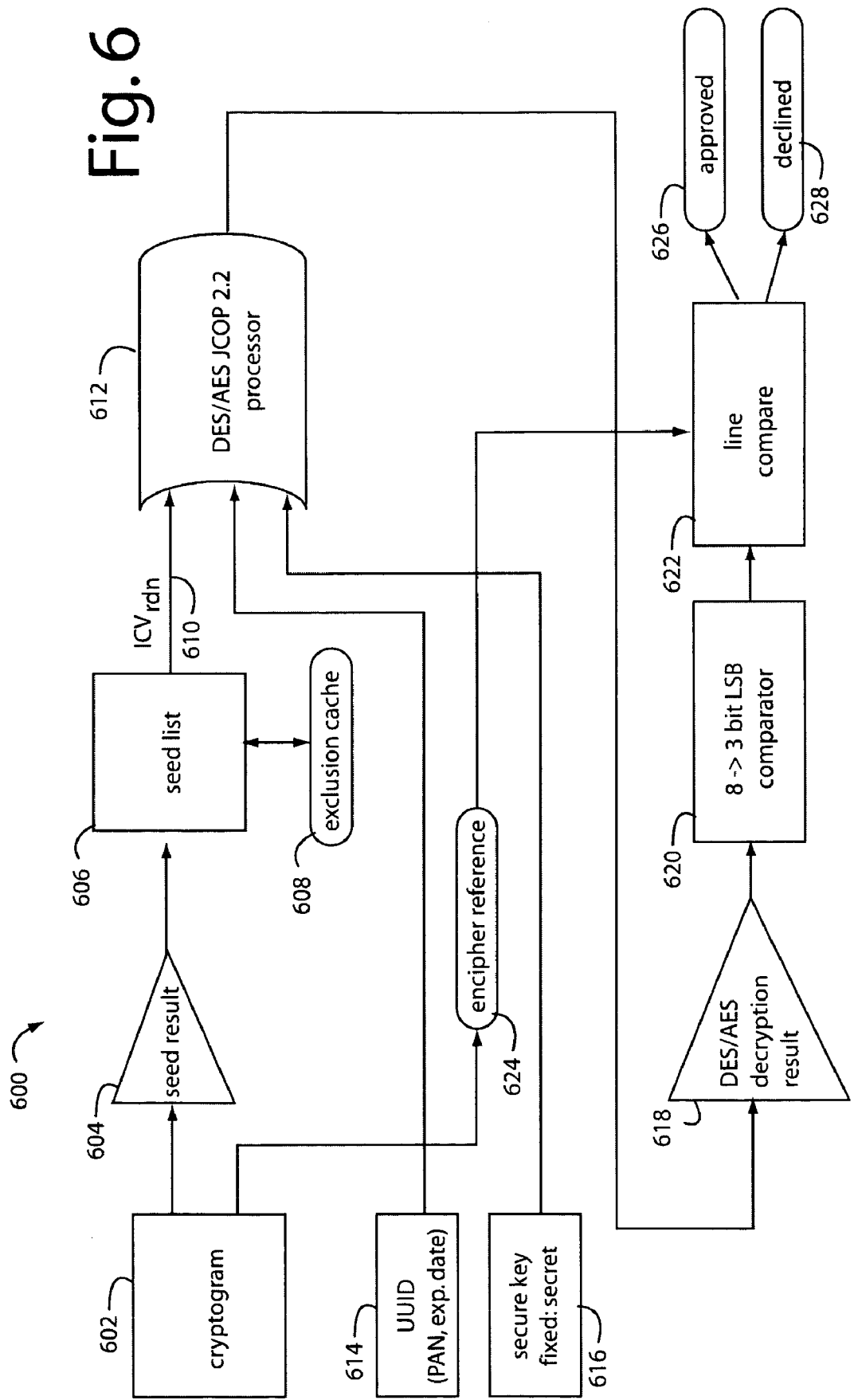

PAYMENT CARD WITH INTERNALLY GENERATED VIRTUAL ACCOUNT NUMBERS FOR ITS MAGNETIC STRIPE ENCODER AND USER DISPLAY

RELATED APPLICATIONS

This Application claims benefit of U.S. Provisional Application Ser. No. 60/634,829, filed Dec. 10, 2004 by the present inventor, Kerry Dennis BROWN, and entitled, PAYMENT CARD WITH INTERNALLY GENERATED VIRTUAL ACCOUNT NUMBERS FOR ITS MAGNETIC STRIPE ENCODER AND USER DISPLAY.

BACKGROUND OF THE INVENTION

1. Field of the Invention

The present invention relates to a payment card, and more particularly to payment cards with internally generated virtual personal account numbers that are visible to a user so as to enable Internet purchases, and that have an internally writeable magnetic data stripe which is machine-readable by point-of-sale legacy card readers.

2. Description of Related Art

Credit card and debit card use have become ubiquitous throughout the world. Originally, credit cards simply carried embossed numbers that were pressed against a carbon copy bank draft in a mechanical card-swiping machine. Merchants simply accepted any card presented, but then fraud became widespread. The used carbons could even be gathered from trashcans to glean account numbers for unauthorized transactions.

Imposing spending limits and issuing printed lists of lost/stolen cards proved ineffective in preventing fraud and other financial losses. So merchants were subsequently required to telephone a transaction authorization center to get pre-approval of a transaction.

These pre-approvals were initially required only for purchases above a certain limit, but as time went on the amounts needing authorization dropped lower and lower. The volume of telephone traffic grew too great, and customers were too impatient to wait for such calls to be completed.

Automated authorization systems appeared everywhere that allowed faster, easier, and verified transactions by using the magnetic stripes on the backs of the cards. The card readers and computers used very much improved speed and accuracy. They also allowed near real-time control of fraudulent card usage. But detecting and reacting appropriately to fraud remained a problem.

Several of the elements which are embossed and magnetically recorded on MasterCard, Visa, and other typical payment cards are there to uniquely identify the account holder. A standardized personal account number (PAN) comprises four fields, e.g., a system number, a bank number, a user account number, and a check digit. Typically, 16-digits in all, in which 7-digits are dedicated and essentially fixed from the perspective of the issuing bank. An expiration date is associated with the PAN and comprises a month and year code, e.g., four more digits, but with limited range. The account holder's name or business usually appears on the face of the card in the embossing and is magnetically recorded on the back.

In order to reduce fraud, a 3-digit card verification code (CVC) has been introduced that appears only as a printed number, e.g., on the signature area on the back of the card. The CVC is not embossed nor magnetically recorded on the card, and many systems cannot report the CVC during a transaction request authorization. The CVC is used with "credit" transactions rather than "ATM" transactions to verify the user is really holding the issued card and not a copy. It's sort of a visual personal identification number (PIN) that is spoken on the phone or written in an Internet order. The traditional PIN for ATM-type transactions is 4-digits and keyed into a machine.

There are two major types of transactions, "online" with the Internet, and "offline" with point-of-sale (POS) use of the card. Offline transactions involve magnetic card readers and always use the full 16-digit PAN and the 4-digit expiration date. Online transactions require the user to read the embossed PAN and expiration date digits, and sometimes also the CVC number.

A principal way to stop the fraudulent use of a stolen or compromised account number has been to simply cancel the old account number and issue a new one with a new expiration date. So the issuing banks put in place a mechanism to invalidate old account numbers and to issue new numbers to existing users. But getting the new card could sometimes take weeks, and the delay would greatly inconvenience the user and cause a lull in spending.

American Express introduced a service called "Private Payments," and Orbiscom (New York) has "Controlled Payment Numbers". Such allow cardholders to shop online without having to transmit their actual card details over the Internet. Discover Desktop and Citibank (New York) have similar products referred to as a "Virtual Account Numbers," that generates substitute credit card numbers for secure online purchasing. Such allows credit card holders to get a virtual account number online that can be used only once. The virtual number generator is either downloaded to the user's computer or accessed online. The user returns to the website for another new virtual number for subsequent transactions. Neither the merchant nor a card-number skimmer can use the number after its first use. So seeing or having the virtual account number will do them no good if the user has already completed the intended transaction. The user is thus protected from fraudulent transactions because the virtual number is moved to an exclusion list. This also prevents an authorized merchant from automatically initiating future charges that a user may not have really agreed to nor been aware of.

A limitation with the Virtual Account Numbers is it requires the use of the Internet or at least a personal computer to get each new number, and the transactions must be online. POS use with magnetic card readers still obtain the real account number and continue to be subject to fraud.

SUMMARY OF THE INVENTION

Briefly, a payment card embodiment of the present invention comprises an internal virtual account number generator and a user display for online transactions. Offline transactions with merchant card readers are enabled by a magnetic array internally associated with the card's magnetic stripe. The internal virtual account number generator is able to reprogram some of the magnetic bits encoded in the magnetic stripe to reflect the latest virtual account number. The internal virtual account number generator produces a sequence of virtual numbers that can be predicted and approved by the issuing bank. Once a number is used, it is discarded and put on an exclusion list. The security level of the unchanging part of the virtual account number is increased three orders of magnitude by further including the expiration date field in the authorization procedures.

An advantage of the present invention is a payment card is provided for use with existing legacy payment card systems.

A further advantage of the present invention is a payment card is provided that can protect both the user and issuing bank from fraud.

A still further advantage of the present invention is that a payment card is provided that does not require hardware or software changes to merchant point-of-sale terminals.

Another advantage of the present invention is that one card can express the personalities of several different kinds of payment cards issued by independent payment processors.

Another advantage of the present invention is a payment card that can generate a new account number upon each usage, and by doing so, authenticate itself to the transaction infrastructure.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIG. 3 is a perspective diagram of a magnetic array embodiment of the present invention as can be used in the devices of FIGS. 1-2;

FIG. 4 is a functional block diagram of a payment system embodiment that can be used with the payment card of FIG. 1;

FIG. 5 is a flowchart diagram of an enciphering process that can be used for the virtual account number generator of FIG. 1;

FIG. 6 is a flowchart diagram of a deciphering process that can be used for the virtual account number validation processor of FIG. 4;

DETAILED DESCRIPTION OF THE INVENTION

Figure 1:
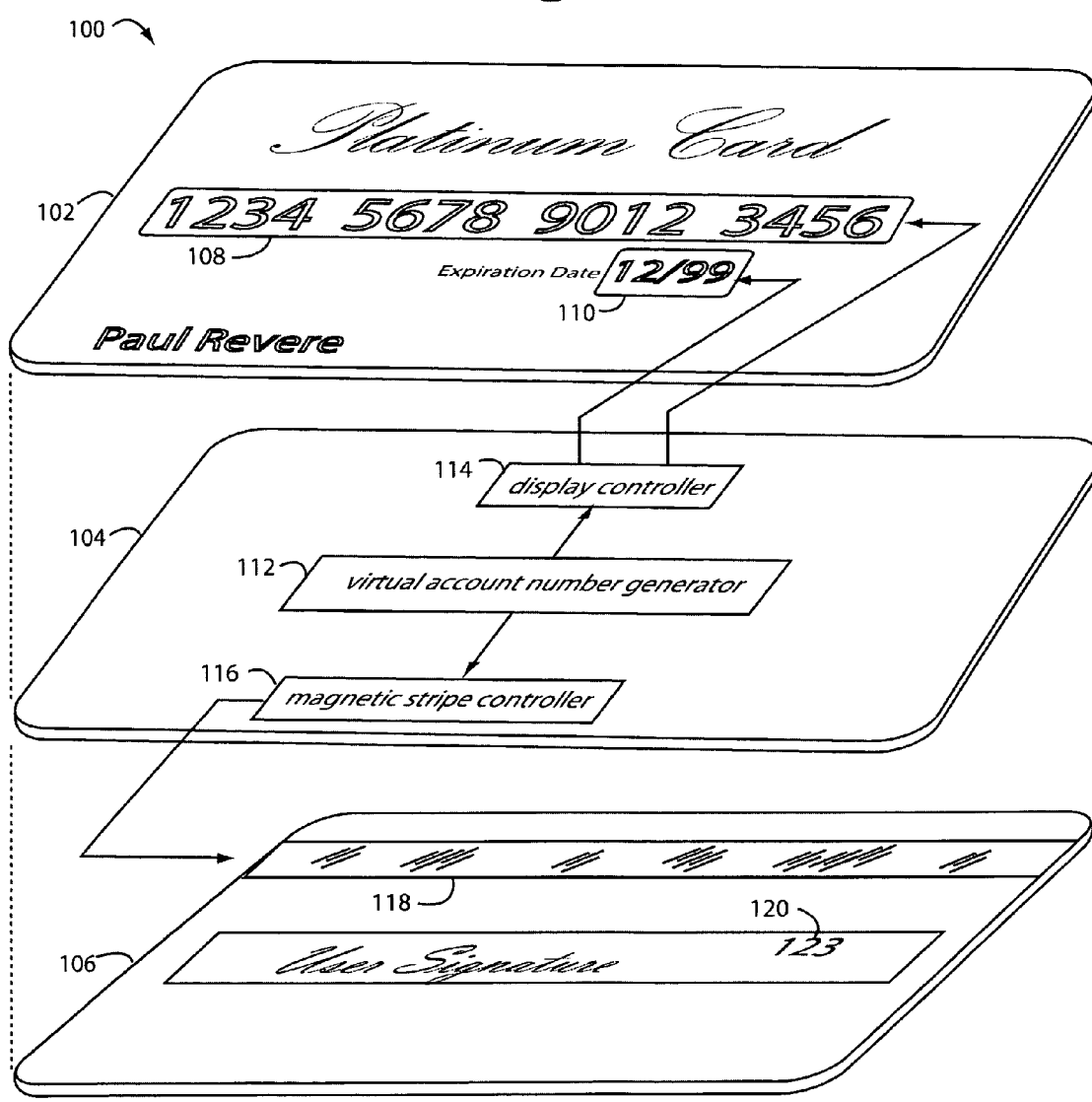
FIG. 1 is a perspective and functional block diagram of a payment card embodiment of the present invention.

FIG. 1 illustrates a payment card embodiment of the present invention, and is referred to herein by the general reference numeral 100. Payment card 100 resembles a typical credit or ATM card, but may be a little thicker because electronics are sandwiched inside. The payment card industry has published standards for all aspects of payment cards, and these regulate the card size, thickness, tolerance to flexing, positioning of account numbers and user information, magnetic recording formats on the magnetic stripe on the back, etc. Payment card 100 is compatible with these industry standards so as to allow rapid assimilation into the payment card system and its use by consumers.

Payment card 100 is shown in FIG. 1 as being comprised of three layers 102, 104, and 106, which are fused together. Other construction methods can be used, e.g., a solid cast material in which the electronics are embedded. The front layer 102 includes a digital user display 108 for displaying a virtual account number. Some of the digits can be fixed and simply embossed and not electronically displayed. An alternative digital user display 110 is used to display an expiration date. The middle layer 104 includes electronics for a virtual account number generator 112, a display controller 114, and a magnetic strip controller 116. The back layer 106 has a programmable magnetic stripe 118 and a printed card verification value (CVV) 120.

The programmable magnetic stripe 118 can be like that described in U.S. patent application Ser. No. 10/738,376, filed 17 Dec. 2003, by the present inventor, Kerry Dennis BROWN, and titled PROGRAMMABLE MAGNETIC DATA STORAGE CARD; and also, U.S. patent application Ser. No. 10/800,821, filed 15 Mar. 2004, by the present inventor, Kerry Dennis BROWN, and titled THREE-LEGACY MODE PAYMENT CARD WITH PARAMETRIC AUTHENTICATION AND DATA INPUT ELEMENTS. Such are both incorporated herein by reference.

The programmable magnetic stripe 118 will typically have three lines of data programming written on it by a magnetic card writer, e.g., by a card issuer. Parts of the magnetic stripe 118 are subject to being reprogrammed from within the payment card 100 itself.

The implementation of payment card 100 is challenging in that all the electronics need to be very thin and low power. The digital displays must be flexible, and any embedded battery needs to be able to operate the electronics for at least one year of typical use. Conventional, albeit advanced technologies are presently available to fabricate payment card 100 as described. Therefore, a detailed description of those fabrication methods is not necessary here.

Some of the digits of the virtual account number in display 108 may be fixed. Such fixed numbers can be embossed or printed and not electronically represented. Similarly, some of the data related to the virtual account number and encoded to magnetic stripe 118 may also be fixed. The fixed bits can be recorded externally by a card writer, while the rest are electronically programmable from within. The fixed bits can represent the card type, and the bank number, e.g., the first 4-5 numbers of the personal account number. There can be some security benefits realized by not writing or displaying the virtual account numbers until there are actually going to be used.

The are two modes of use for payment card 100, online and offline. More specially, online relates to online Internet use where no card reader is present, e.g., "card not present" transactions. The user must manually read off to the merchant the virtual account number and the expiration date. For example on the telephone or typed into an order form on a website. A new valid use-once account number will appear in user display 108, e.g., in response to some stimulus, like the pressing of a membrane switch button or sequence. Offline relates to point-of-sale (POS) use where a merchant card reader is present. The virtual account number and expiration date are machine-read by a magnetic card reader. A new valid use-once account number will appear in magnetic stripe 118, e.g., again in response to some stimulus like sensing the swiping of the card in the reader. The sending of the virtual account number to the user display 108 and magnetic stripe 118 can be independent, or they can be coordinated in the case of an offline POS transaction where the merchant is required to read off the last four account numbers and key them manually into the card reader.

A magnetic array is arranged on the back of the card 100 behind magnetic stripe 118. This presents what appears to be an ordinary magnetic stripe encoded with appropriate bank and user information for a conventional magnetic card reader. Such readers are ubiquitous throughout the world at point-of-sale terminals, and it is very important not to require any changes to these readers in order to accommodate the proper use of payment card 100.

An embedded power source is needed by payment card 100 that can last for the needed service life of a typical smartcard, e.g., about eighteen months to four years. A battery or a piezoelectric generator and charger can be used. Such piezoelectric generator converts incidental temperature excursions and mechanical flexing of the card into electrical power that can charge a storage capacitor or help maintain the battery. A piezoelectric crystal is arranged to receive mechanical energy from card flexing and/or keypad use. The charger converts the alternating current (AC) received into direct current (DC) and steps it up to a voltage that will charge the battery. Alternative embodiments can include embedded photovoltaic cells to power the card or charge the battery.

Figure 2:
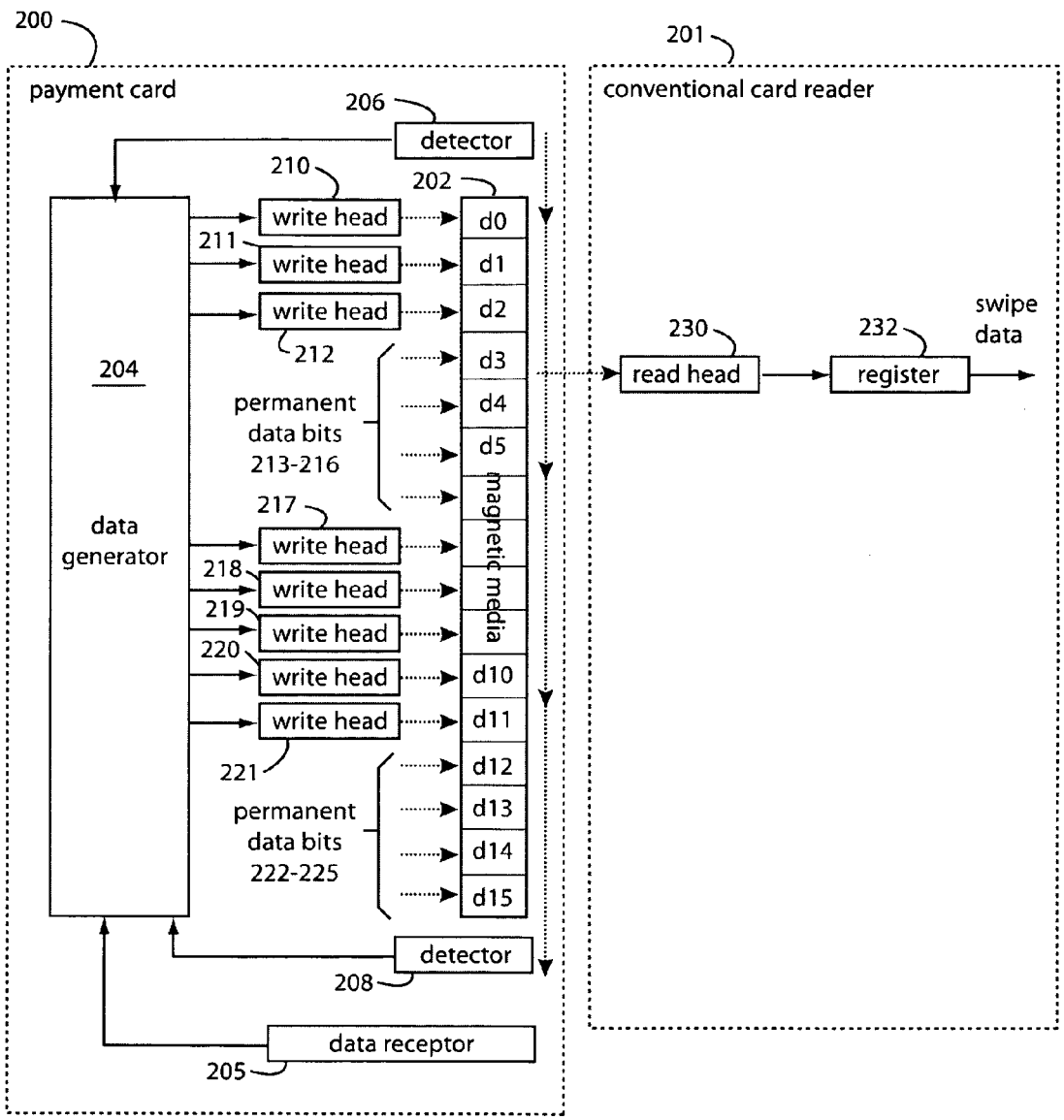
FIG. 2 is a functional block diagram of a legacy magnetic card and reader embodiment of the present invention.

FIG. 2 illustrates a payment card embodiment of the present invention, and is referred to herein by the general reference numeral 200. In particular, FIG. 2 details the way magnetic array 108 and the legacy magnetic interface 109 can operate.

A conventional, "legacy", merchant point-of-sale magnetic-stripe card reader 201 is used to read user account data recorded on a magnetic stripe 202 on the payment card 200. Such is used by a merchant in a traditional way, the payment card 200 appears and functions like an ordinary debit, credit, loyalty, prepay, and similar cards with a magnetic stripe on the back.

User account data is recorded on the magnetic stripe 202 using industry-standard formats and encoding. For example, ISO/IEC-7810, ISO/IEC-7811(-1:6), and ISO/IEC-7813, available from American National Standards Institute (NYC, N.Y.). These standards specify the physical characteristics of the cards, embossing, low-coercivity magnetic stripe media characteristics, location of embossed characters, location of data tracks 2-3, high-coercivity magnetic stripe media characteristics, and financial transaction cards. A typical Track-1, as defined by the International Air Transport Association (IATA), is seventy-nine alphanumeric characters recorded at 210-bits-per-inch (bpi) with 7-bit encoding. A typical Track-2, as defined by the American Bankers Association (ABA), is forty numeric characters at 75-bpi with 5-bit encoding, and Track-3 (ISO/IEC-4909) is typically one hundred and seven numeric characters at 210-bpi with 5-bit encoding. Each track has starting and ending sentinels, and a longitudinal redundancy check character (LRC). The Track-1 format includes user primary account information, user name, expiration date, service code, and discretionary data. These tracks conform to the ISO/IEC/IEC Standards 7810, 7811-1-6, and 7813, or other suitable formats.

The magnetic stripe 202 is located on the back surface of payment card 200. A data generator 204, e.g., implemented with a microprocessor, receives its initial programming and personalization data from a data receptor 205. For example, such data receptor 205 can be implemented as a serial inductor placed under the magnetic stripe which is excited by a standard magnetic card writer. Additionally, the data may be installed at the card issuer, bank agency, or manufacturer by existing legacy methods. The data received is stored in non-volatile memory. Alternatively, the data receptor 205 can be a radio frequency antenna and receiver, typical to ISO/IEC/IEC Specifications 24443 and 25693. The data generator 204 is represent in FIG. 1 as virtual account number generator 112. It may be part of a secure processor that can do cryptographic processing, similar to Europay-Mastercard-Visa (EMV) cryptoprocessors used in prior art "smart cards".

Card-swipes generate detection sensing signals from one or a pair of detectors 206 and 208. These are embedded at one or each end of magnetic stripe 202 and can sense the typical pressure applied by a magnetic read head in a scanner. A first set of magnetic-transducer write heads 210-212 are located immediately under bit positions d0-d2 of magnetic stripe 202. The data values of these bits can be controlled by data generator 204. Therefore, bit positions d0-d2 are programmable.

Such set of magnetic-transducer write heads 210-212 constitutes an array that can be fabricated as a single device and applied in many other applications besides payment cards. Embodiments of the present invention combine parallel fixed-position write heads on one side of a thin, planar magnetic media, and a moving serial read head on the opposite side. Such operation resembles a parallel-in, serial-out shift register.

A next set of bit positions 213-216 (d3-d6) of magnetic stripe 202 are fixed, and not programmable by data generator 204. A conventional card programmer is used by the card issuer to program these data bits. A second set of magnetic write heads 217-221 are located under bit positions d7-d11 of magnetic stripe 202. The data values of these bits can also be controlled by data generator 204 and are therefore programmable. A last set of bit positions 222-225 (d12-d15) of magnetic stripe 202 are fixed, and not programmable by data generator 204. In alternative embodiments of the present invention, as few as one bit is programmable with a corresponding write head connected to data generator 204, or as many as all of the bits in all of the tracks.

The legacy card reader 201 is a conventional commercial unit as are already typically deployed throughout the world, but especially in the United States. Such deployment in the United States is so deep and widespread, that conversion to contact and contactless smartcard systems has been inhibited by merchant reluctance for more purchases, employee training, counter space, and other concerns.

It is an important aspect of the present invention that the outward use of the payment card 200 not require any modification of the behavior of the user, nor require any special types of card readers 201. Such is a distinguishing characteristic and a principle reason that embodiments of the present invention would be commercially successful. The card reader 201 has a magnetic-transducer read head 230 that is manually translated along the length of data stripe 202. It serially reads data bits d0-d15 and these are converted to parallel digital data by a register 232.

The magnetic-transducer write heads 210-212 and 217-221 must be very thin and small, as they must fit within the relatively thin body of a plastic payment card, and be packed dense enough to conform to the standard recording bit densities. Integrated combinations of micro-electro-mechanical systems (MEMS) nanotechnology, and longitudinal and perpendicular ferromagnetics are therefore useful in implementations that use standard semiconductor and magnetic recording thin-film technologies.

FIG. 3 illustrates a magnetic data storage array embodiment of the present invention, and is referred to by the general reference numeral 300. The magnetic data storage array 300 includes a magnetic stripe 302 that mimics those commonly found on the backs of credit cards, debit cards, access cards, and drivers licenses. In alternative embodiments of the present invention, array 300 can be a two-dimensional array, and not just a single track.

Here in FIG. 3, magnetic data bits d0-d2 are arranged in a single track. A set of fixed-position write heads 304, 306, and 308 respectively write and rewrite magnetic data bits d0-d2. A moving, scanning read head 310 in a legacy magnetic card reader is used to read out the data written.

Parts of magnetic data storage array 300 can be implemented with MEMS technology. In general, MEMS is the integration of mechanical elements, sensors, actuators, and electronics on a common substrate using microfabrication technology. Electronics devices are typically fabricated with CMOS, bipolar, or BICMOS integrated circuit processes. Micromechanical components can be fabricated using compatible. "micromachining" processes that selectively etch away parts of a processing wafer, or add new structural layers to form mechanical and electro-mechanical devices.

In the present case, MEMS technology can be used to fabricate coils that wind around Permalloy magnetic cores with gaps to produce very tiny magnetic transducer write heads. For example, a magnetic transducer write head that would be useful in the payment card 100 of FIG. 1 would have a gap length of 1-50 microns, a core length of 100-250 microns, a write track width of 1000-2500 microns, and a read track width of 1000 microns. Nickel-iron core media permeability would be greater than 2000, and cobalt-platinum or gamma ferric oxide media permeability would be greater than 2.0, and the media coercivity would be a minimum of 300 Oe.

A parallel array static MEMS (S-MEMS) device is a magnetic transducer which will allow information to be written in-situ on the data tracks of a standard form factor magnetic stripe card. In a practical application, an array of twenty-five individual magnetic bit cells can be located at one end of an ISO/IEC/IEC 7811 standard magnetic media. Such a stripe includes some permanent encoding, as well as a region in which data patterns can be written by arrays of magnetic heads attached to a low-coercivity magnetic stripe.

Each cell of such parallel array is independently electronically addressed. Write transducer current may flow in one direction or the other, depending on the desired polarity of the magnetic data bits. The magnetic stripe transaction reader operates by detection of magnetic domain transitions within an F2F scheme typical of such cards and, therefore, magnetic domain reversal is not necessary. A prototype write head included a high permeability NiFe core with electroplated windings of copper wires. For example, a useful write head has a z-dimension (track width) of 1000-2500 microns, a width of 100 microns in the x-direction, and a height in the y-direction of approximately 20 microns. There are four coil turns around each pole piece, for a total of eight. The cross sectional area of the coil was estimated at four microns square, with a three micron spacing. Total length in the x-direction, including core and coils, was 150 microns, and about a ten micron spacing between adjacent magnetic cells.

Referring again to FIG. 1, the display 108 presents a 16-digit personal account number (PAN). The first digit is typically used as a type identifier, e.g., "4" is Visa, and "5" is MasterCard. The next 3-5 digits identify the issuing bank, e.g., "789" for Washington Mutual, "581" for PayPal, "919" for Charles Schwab, and "571" for Citibank. These are fixed field digits. The last digit is an LRC-check digit, it is a computed value and adds some security, but not much since the algorithm is public.

For example, a particular Citibank card uses a "5" as card identifier, and "4661" as a bank identifier. This allows 10-digits and one LRC-checkdigit to be manipulated to identify a user and a virtual account number assignment. The expiration date can add a bit more information to validate the card, but not as much as four unconstrained digits would. The expiration date, after all, represents a date. It also must be in the future at card issuance. So the range of the first two digits (M1, M2) is 01-12 for January through December. The last two digits (Y1, Y2) typically can only represent a 5-year range, for 2004 the possible numbers would range only 04-09.

The expiration date can be used to discriminate 1.1% of a user population. For 75 million CitiBank MasterCards, 1.1% is 82,000. Five significant digits in the PAN must be devoted to discriminate amongst 75 million users, because 80,000 would share the same expiration date. Any remaining digits can be used to implement virtual account numbers for one-time transaction use.

So in this example, not counting the LRC-checkdigit there ten digits are available in the PAN, but five digits are needed for user discrimination. Such yields an order of magnitude more security than the 4-digit "PIN level" in common use, and so should be acceptable to most banks.

The security can be improved by adding more orders of magnitude, e.g., by extending the card validity period beyond the typical three years. The bank identifier can be shortened to free up a digit, and the PAN field could be expanded to the full 19-digits allowed by International Standards Organization (ISO) industry-standards. But such would require changes to the MasterCard assignment tables and may be difficult. The extension of the validity period is easily done within the bank.

The assignment of PAN, expiration date, CVC, and other bank personalization process numbers for each new, expired, or renewed account can be optimized to allow accurate distribution of accounts across a full 36-48 month period.

In an alternative embodiment, the CVC can be used for off-line analysis and yield nine digits or orders of magnitude security. But such may not be useful for online transactions because merchants do not always demand the CVC.

The Card has a display for online purchases, but it is not necessary for offline purchases. Online refers to internet or phone purchases known as "card not present" transactions. Offline refers to merchant machine purchases ("point of sale", or "card acceptance systems").

The PAN may have as few as 3, or as many as 5, bank identifier digits, as mentioned above. The fewer the better, in our examples, though account base variance by an order of magnitude has equal affect.

FIG. 4 illustrates a virtual account number payment card processing system embodiment of the present invention, and is referred to herein by the general reference numeral 400. The system 400 uses a payment card 402 that is very similar to payment card 100 (FIG. 1). That is, payment card 402 is able to change its magnetic card data 404 that is elicited by a card reader 406. It is also able to display the personal account number which includes the virtual account number. Either can be entered into the system for bank authorization.

The card reader 406 performs various magnetic data operations and checks on the card magnetic data 404. For example, a longitudinal redundancy code (LRC) check that helps assure a valid read of all the data has been made. Once the card reader 406 has determined the card magnetic data 404 is good, an approval request message 408 is sent to a card acquirer 410. Such message includes the user account number, dollar amount of the transaction, and merchant identification (ID).

The validation processing center 410 provides regional high speed network servers that are often operated by third parties and not the issuing banks. The validation processing center 410 checks to see if the user card 402 is not stolen or lost, and other first level account validation. It may also have cached some information from an issuing bank about this user account if the account has been processed before very recently. For example, an exclusion list.

A card acquirer approval request message 412 is sent to an issuing bank 414. It also includes the user account number, dollar amount of the transaction, and merchant identification (ID). The user virtual account number is cryptographically checked for validity in a processor 416. The user account checked to see if adequate funds are available. If so, an authorization message 418 is returned. A reconciliation of the user account is made and the merchant's account is credited within a day or two. The card acquirer 410 records the issuing-bank authorization and forwards an approval message 420. The merchant point-of-sale card reader 406 displays the approval and an authorization code, and the transaction is completed. The virtual account number validation processor 416 then adds the number just used to the exclusion list so that it cannot be used again. The payment card 402 also discards this number and readies a new number according to an enciphering scheme.

It is critical to note that the payment card 402 is completely autonomous, and requires no feedback or other data return from the rest of the system. This is necessary in order to have the payment card 402 work within the legacy payment systems now in place.

Magnetic data is arranged serially in a sequence of thirty-seven numeric data characters, with several more start, end, and data integrity check characters used as field separators. This is the data read by the merchant point of sale terminal. The POS terminal strips away the SS, FS, ES, and LRC characters and forwards the PAN, Additional Data, and Discretionary Data to the merchant acquirer, through the transaction network, and on to the issuing card bank. Table-I illustrates the placement of these data fields on a typical credit card magnetic stripe.

TABLE I

<37 numeric characters>

| SS | PAN | FS | Additional Data | Discretionary Data | ES | LRC |
|---|---|---|---|---|---|---|

| | Description |
|---|---|
| SS | one character Start Sentinel, to indicate start of data sequence |
| PAN | 19 character account number field (maximum), includes one digit card type, up to five digits bank identifier, and up to 12 digit account number |
| FS | one character Field Sentinel to separate data fields |
| Additional Data | seven characters for expiration date, service code, etc. |
| Discretionary Data | eight characters for CVC/CVV/PVV data |
| ES | one character End Sentinel to identify end of data string |
| LRC | one character check digit to confirm magnetic data integrity |

A typical CitiBank visa card is diagrammed in Table II. Each transaction changes the data, and affects the probability of guessing the next number in sequence.

TABLE II

<37 numeric characters>

| SS | | FS | | | ES | |
|---|---|---|---|---|---|---|
| | 5466 1600 5267 1983 | | 0503 149 | 99999999 | | 9 |

In this example, the first digit identifies this card as a Visa (5), and the CitiBank routing number is identified in the next 4 digits (4661). The user's account number is 005267198, with a check digit of "3". This number can be fixed to be able to identify the user's account by some number, whether it is the Discretionary Data field, or the PAN field.

The expiration date is preferably fixed and does not change so the transaction network can qualify prior to bank authorization, and prevent unnecessary network loading.

A "service code" number can be changed according to a bank's requirements. This service code can be used to identify the card to the transaction network as a "special" card. The Discretionary Data field is defined by the bank and consists of 8-9 characters. This field allows for 99,999,999, or 999,999,999, possible combinations of numbers. Such implies one in 100-million, or one in one-billion chance of guessing the next valid number. However, the type of cryptography used will determine the actual statistical odds of guessing the next number. The number of seed values used in a table is one variable, each seed may be used for one transaction, with about 1,500 per card as defined by the bank. In this example, the odds are reduced to about 1:100,000 or 1:1,000,000

The probability of guessing the next seed number in a sequence is very low. If the sequence is unknown to the hacker, each subsequent attempt increases the odds until the last possible transaction with 1,500 possible seeds returns to 1:100,000,000 or 1:1,000,000,000. In other words, each subsequent transaction increases the odds of guessing a next valid number.

The LRC must also be included, since it is dynamic and dependent upon the new CVC number. This may increase the odds another order of magnitude, but most hackers may know how to change this value.

The PAN field may not use all 19 characters. This may allow us to use 2-3 characters for analysis, and increases the odds of guessing a new CVC number by up to three orders of magnitude, or a thousand-fold increase. It is probably best not to use this field for analysis because the statistical odds are already very high.

Asymmetric cryptography can increase the statistical odds greatly, as would the use of camouflage cryptography. An important aspect of a dynamic CVC field is that the statistical odds are always associated with each card. With ten million unique cards, the actual number of dynamic numbers is around 10-million times 100-million to one billion. That is a very large number, and those numbers are unique and not repeating. The CVC field can be used security purposes since the statistical odds are so high.

A dynamic numerical analysis (DNA) server can decrypt the CVC number and forward the real CVC number to the bank server, which will then process the transaction. The DNA server should also check that the dynamic number seed value has not been previously used. If it was, such indicates a fraudulent transaction. However, due to batch processing methods of some merchants, a tolerance of +5 transaction sequences is more pragmatic. That is, the number can vary with five predicted transactions and still be considered a valid transaction.

The dynamic number seed value should be valid and predicted. If it is not valid, then that indicates a hacker guessing the number. The bank should invalidate the card immediately.

The dynamic number can include a PINCard reference identifier to indicate nested accounts. For example, multiple accounts on a single card for use by family members, and the server can advise the bank server of such nesting for accounting or billing statement options desired by the card holder.

FIG. 5 represents an enciphering process 500 that can be used for the virtual account number generator 112 of FIG. 1.

Process 500 includes a seed value 502 that is fed to a random number generator (RNG) 504. This fills a seed list 506 and an exclusion cache 506 is used to eliminate previously used and discarded numbers. An initial changing vector 510 is sent to a DES/AES processor 512. A UUID PAN 514 is coupled with an expiration date 516. A UUID: secret key 518 is generated from a session key 520. A DES/AES encryption result 522 is concatenated with a random number 524. An open standard cryptogram camouflage obfuscation process 526 packets a message. A converter 528 is used to reduce the message size. A processor 530 does a final data parsing and LRC-checkdigit computation. A virtual account number 532 is generated to the user display 108 and magnetic strip 118, for example.

FIG. 6 represents a deciphering process 600 that can be used for the virtual account number validation processor 416 of FIG. 4. It reverses the process of FIG. 5. The deciphering process 600 receives a cryptogram message 602 in a transaction authorization request. A seed result 604 is sent to a seed list 606. An exclusion cache 608 is used to invalidate previously used and discarded virtual account numbers. A random ICV 610 is forwarded to a DES/AES processor 612. A PAN and expiration date are received in a UUID 614. A secure key 616 is also input to the DES/AES processor 612. A DES/AES decryption result 618 is sent to a comparator 620. An encipher reference 624 is used in a line compare 622. The result is either an approved response 626 or a declined response 628 is returned to the merchant POS 406, for example.

The following online cryptographic analysis of personal account number and expiration date fields assumes there are sixteen PAN digits, of which seven are dedicated. Of these dedicated digits, the first is the card system assignment. The next five digits are bank routing numbers, and the last digit is a check digit.

There are therefore nine PAN digits that are available for bank account number assignment. There are also four expiration date digits assigned by the bank.

The standard MasterCard/Visa merchant-agreed financial transaction requirements are such that offline transactions will always use the PAN, expiration date, and CVC/CVV data retained on the track #2 ABA encoded magnetic stripe. The usage of a nine digit CVC/CVV number has already been demonstrated by a prototype financial transaction simulator to have eight orders of magnitude statistical probabilities in security.

Online transactions with embodiments of the present invention depend on a combination of the PAN and expiration date digits displayed on the card.

As an example, suppose a typical credit card issuing bank would like to issue five million MasterCards with virtual PAN numbers, and each with four orders of magnitude security. Such level of security equals that of "PIN level" security, and is widely accepted as adequate. A typical issuer issues cards with a twenty-four month expiration date.

In such case, a fixed PAN field of five digits and a fixed expiration date field of three significant digits when combined will obtain seven orders of magnitude of unique number assignment for the five million account holders.

For each account holder, a variable PAN field of four digits (excluding the check-digit), will provide four orders of magnitude security. Such field is sequenced by a cryptoprocessor using a secure method. The financial transaction security increases with each successive transaction because the number of remaining valid codes shrinks. Each code generated is added to an exclusion cache and removed from the statistical probability table.

A dye-diffusion, electrophoresis, or similar low cost and low power digital display is used to visually display the new number generated on the credit card. This number can then be verbally confirmed for telephone purchases, or copied into a web browser for online purchases.

Such display is not strictly necessary for offline purchases because the cryptoprocessor will generate the new number and transfer it to a MEMS device embedded within the magnetic stripe for reading by the merchant point-of-sale card acceptance system.

The four month-year (MMYY) date digits have a shared customer probability of:

M1, first digit=33% of being a "1", and 67% of being a "0";
M2, second digit=10% of being any number, and 8% being any number linked to Y2;
Y1, first digit=100% (for next 4-5 years, and therefore not useful)
Y2, second digit=33% (due to mid-year card issuance).

Security can be improved by extending the card issuance to five years. In practice, many cards are changed or cancelled prior to their expiration date. The Bank identifier number also has an influence on the level of security, some banks are identified with four digits while others are identified by five. Therefore, about 1.5%-2% of a five million customer base share three significant date digits. This is about 100,000 common accounts. Five additional significant digits are needed for discriminating amongst accounts.

An embodiment of the present invention has a PAN field of five fixed account digits that compliment three significant expiration date digits. This combines for a total of seven orders of magnitude (ten million) unique account numbers. The PAN field has four variable digits, plus a dependent variable check-digit for use by the cryptoprocessor. The display provides numbers sequences with four orders of magnitude security level. The contributions to security by the check-digit are unknown, and assumed to be zero.

Each generated number used in a financial transaction is copied to a secure exclusion cache within the cryptoprocessor purse application. Such excluded number cannot be used in any future transaction associated with the same card.

A bank dynamic number process server is used to analyze the numbers submitted for transaction approval and determine if there is a fraud profile. Such a profile may include three consecutive attempts to submit an invalid number, two concurrent attempts of submission with the same number, etc. In this event, the card user would be notified, the card would be cancelled, and a new card automatically sent to the user. This statistical profiling of fraud is more effective than present methods because of the virtual account number capability of the card.

A typical card can have a PAN and expiration date sequence where the first six digits are industry-assigned system and bank routing numbers, X is the virtual number, and Y is the check-digit. For example, 5561 6504 248X XXXY 12/06. Valid virtual account numbers therefore would include:

5561 6504 2481 9345 1206, and the next sequence may be,
5561 6504 2489 5468 1206, and the next sequence may be,
5561 6504 2483 1634 1206, etc.

The cryptographic method disclosed that will support a card base of five million unique account holders, within existing MasterCard/Visa card numbering standards, and allow four orders of magnitude security that can be applied offline or online that utilize the fields presently analyzed by the issuing bank and the merchant acquirer network.

Such cryptographic method can be transparent to existing financial transaction network processing. Only the issuing bank can see or control the analysis and approval processes.

Statistical models can be developed to profile fraud and minimize the impact upon the bank and the account holders.

Figure 7:
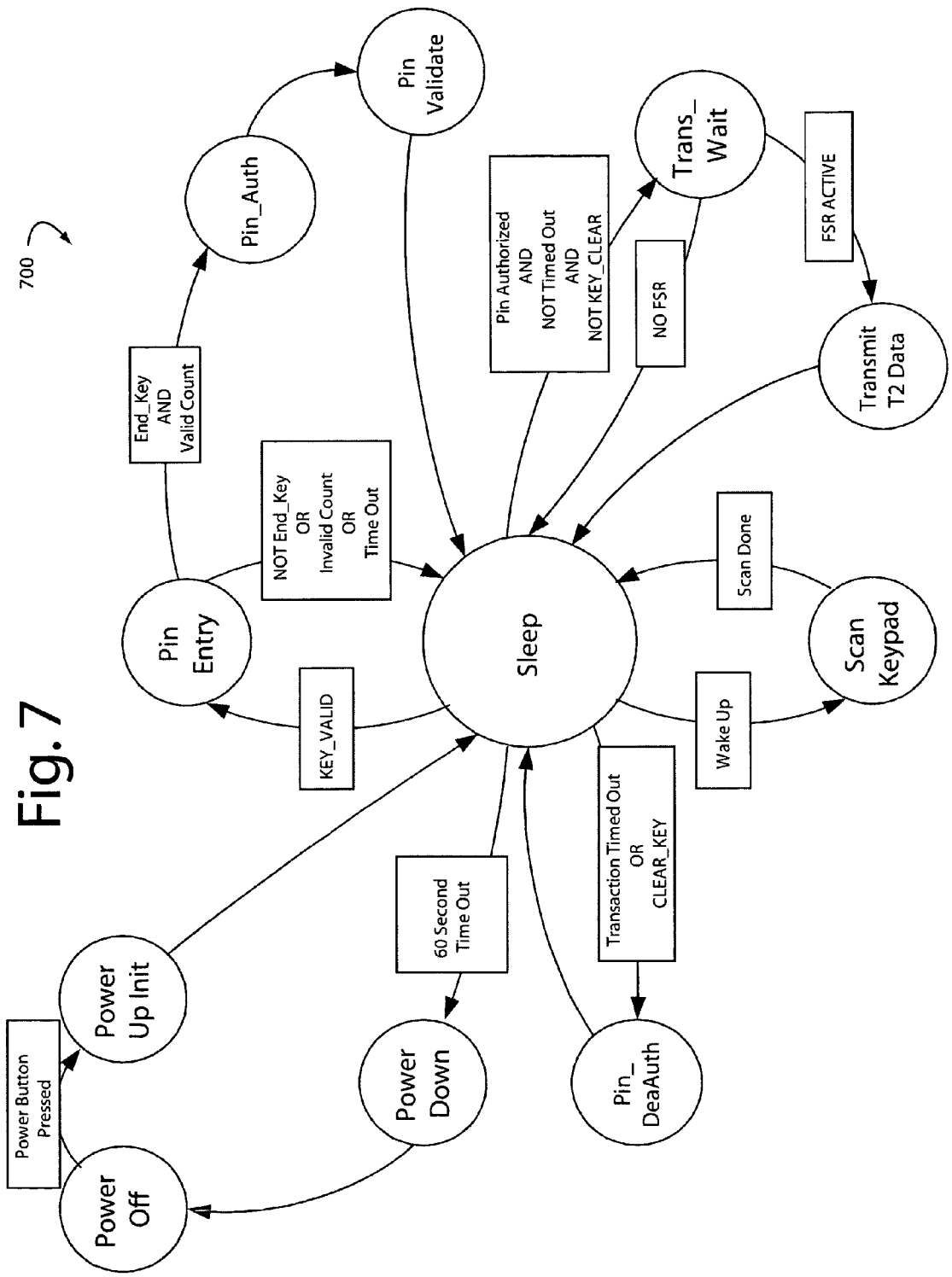
FIG. 7 is a state diagram of personal identification number (PIN) process useful in the payment card illustrated in FIG. 1.

FIG. 7 is a state diagram of personal identification number (PIN) process 700 useful with payment card 100 illustrated in FIG. 1. The idle state is sleep. A correct PIN entry is required for transaction data transmission (T2 data).

Figure 8:
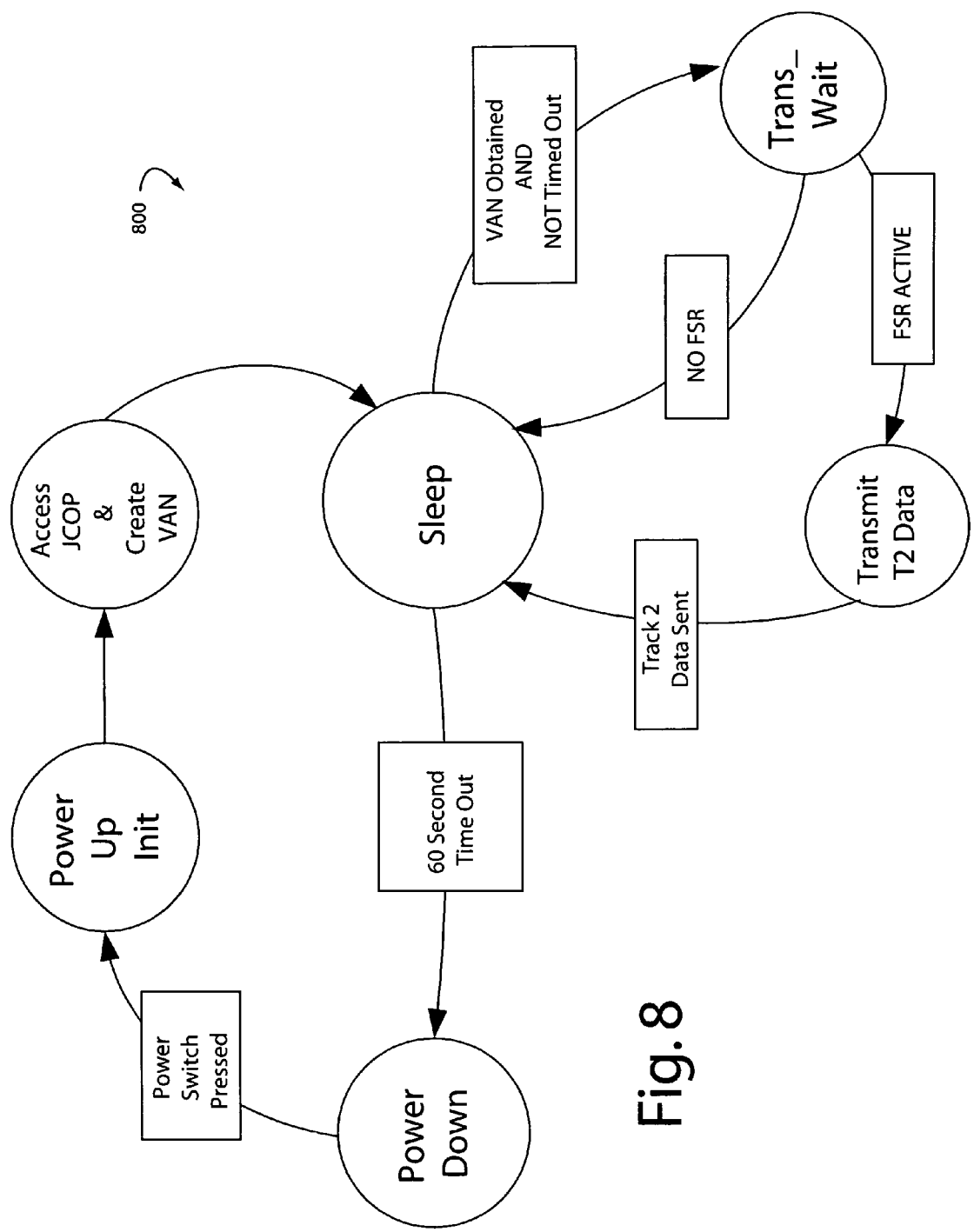
FIG. 8 is a state diagram of virtual account number (VAN) process useful in the payment card illustrated in FIG. 1.

FIG. 8 is a state diagram of virtual account number (VAN) process 800 useful with payment card 100 illustrated in FIG. 1. The idle state is sleep. A VAN is created at power up. Such VAN can then be transmitted out magnetically and/or visually to complete a transaction.

Figure 9:
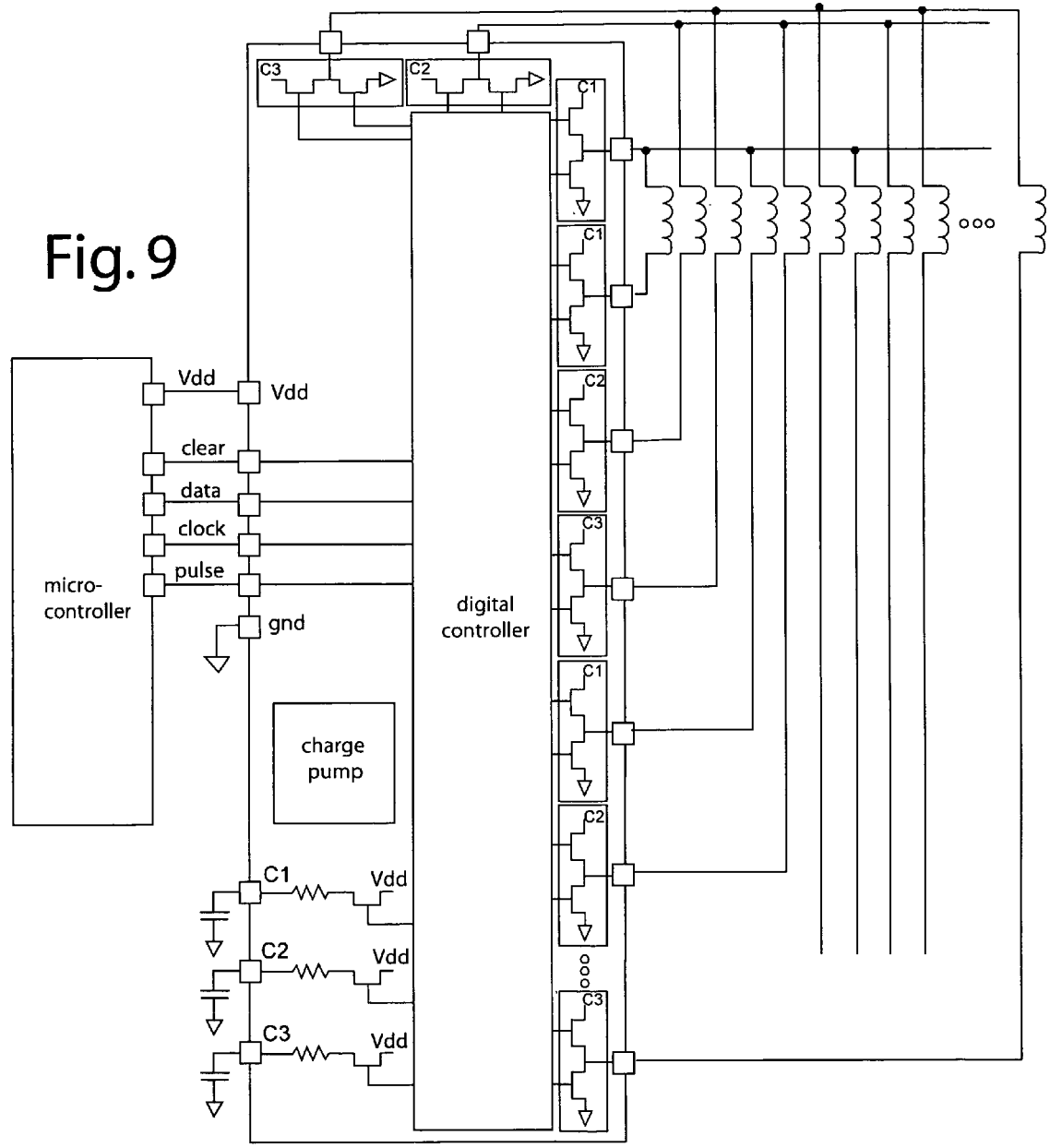
FIG. 9 is a schematic diagram of a magnetic array and controller embodiment of the present invention useful in various payment card embodiments.

FIG. 9 represents a MEMS magnetic array and controller embodiment of the present invention useful in various payment card embodiments. In a typical application, as many of seventy parallel magnetic bits need to be programmed and reprogrammed. Each is associated with a write coil. It is not practical to write all of them in parallel due to battery and current limitations. Each bit must receive an adequate write current for it to program well enough to persist. Programming only one or two bits at a time is also not practical because programming one bit can deprogram its two neighbors.

Figure 10:
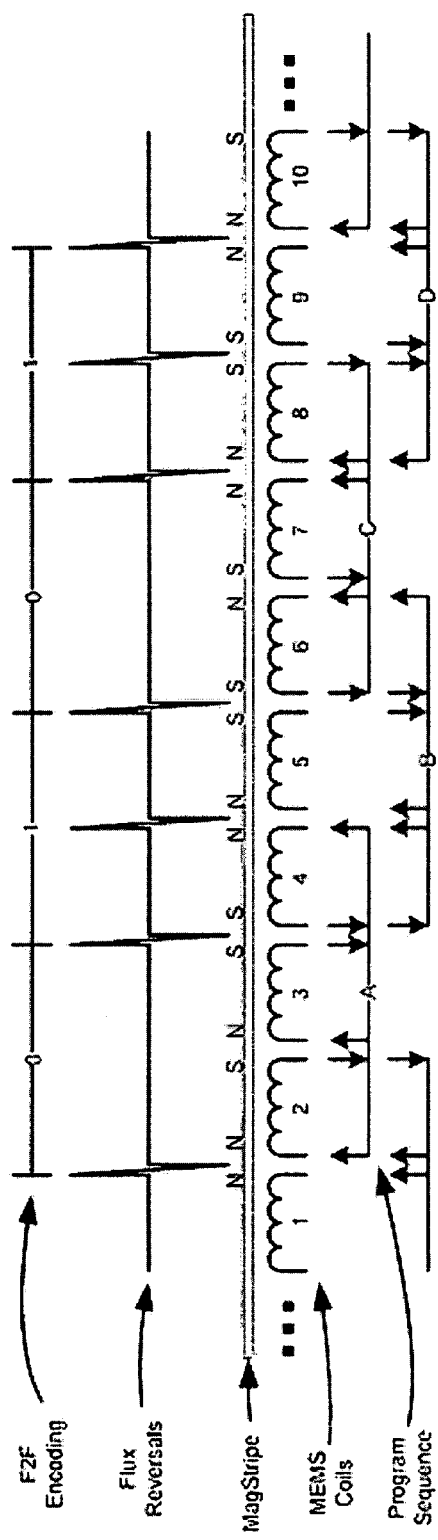
FIG. 10 is a diagram showing the relationships between data encodings, flux reversals, a magnetic stripe, MEMS coils, and a programming sequence for the magnetic array of FIG. 9.

FIG. 10 shows the relationships between data encodings, flux reversals, a magnetic stripe, individual MEMS coils, and a programming sequence embodiment of the present invention for the magnetic array of FIG. 9. A three-coil programming method is shown that sequentially updates a bit pair at a time until all bits are written. Each lack of a bit reversal is a 0-bit, and each bit reversal is a 1-bit. A set of three capacitors are multiplexed to each set of three coils in each program cycle. Capacitors are used to build up a sufficient energy charge with a low enough source impedance to produce the required pulse of current needed in each coil. Once programmed, the multiplex target address is incremented by two-bits. With 0.1 microfarad capacitors, and three milliamp peak charge currents, a cycle could complete in 150-microseconds. With eighty coils for forty bits, two coils per bit, the total program time would be about twelve milliseconds.

Figure 11:
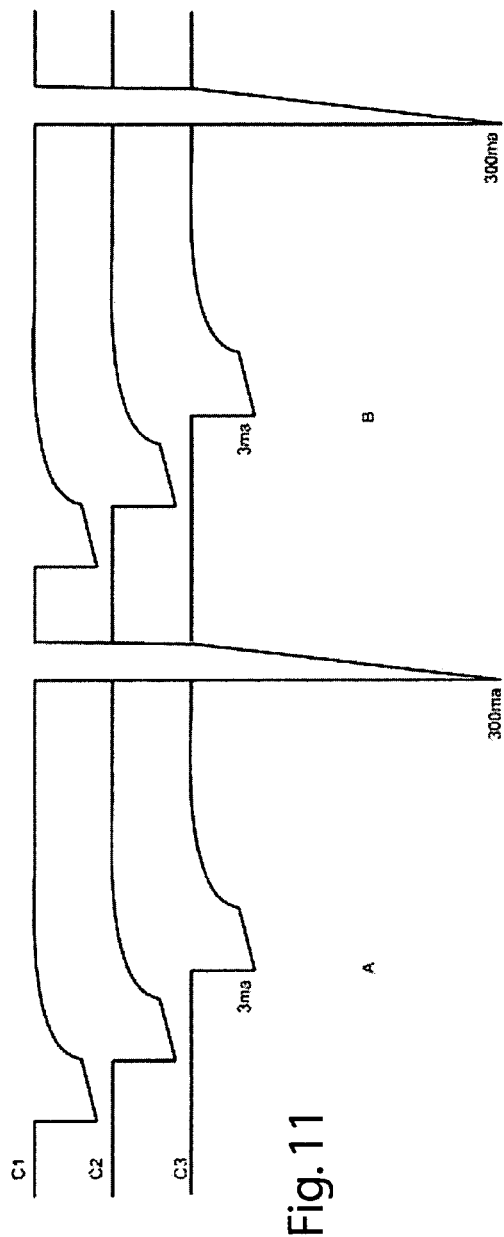
FIG. 11 is a chart representing the charge and discharge voltage cycles, and corresponding current sink pulses of three capacitors C1-C3 associated with the circuits of FIGS. 9 and 10.

FIG. 11 illustrates the charge and discharge voltage cycles, and corresponding current sink pulses of three capacitors C1-C3 associated with the circuits of FIGS. 9 and 10.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A payment card comprising:
a plastic carrier with the dimensions of a credit card;
a magnetic stripe disposed in a rear surface providing for a combination of fixed, permanent data bits and programmable data bits in one magnetic data to be read by an external legacy card reader;
a magnetic array positioned in the magnetic stripe and providing for one part of a virtual account number (VAN) to be internally updated in said programmable data bits of said magnetic data from below without assistance from an external device; and
a VAN generator embedded in the plastic carrier and connected to communicate at least some part of said VAN to the magnetic array;
wherein, each new VAN belongs to a sequence of numbers that can be predicted and used to authenticate a transaction instigated through an external legacy card reader.

2. The payment card of claim 1, further comprising:
a user display disposed within the plastic carrier and connected to the VAN generator, and for showing said VAN long enough to enable a payment transaction which was not instigated through an external legacy card reader.

3. The payment card of claim 1, further comprising:
an expiration date field included with said VAN and providing for increased transaction security levels by using an expiration date data to more securely identify a valid account holder.

4. The payment card of claim 1, further comprising:
a means for disposing of each new VAN after use that includes putting it on an externally maintained exclusion list.

5. The payment card of claim 1, further comprising:
a micro-electro-mechanical systems (MEMS) device which includes the magnetic array and magnetic stripe and is implemented with thin-film semiconductor technologies.

6. The payment card of claim 1, further comprising:
a plurality of coils included with the magnetic array and magnetic stripe, and each coil having a fixed-position for magnetic data-writing of bits that can be read by said external legacy card reader.

7. The payment card of claim 1, wherein the magnetic stripe provides for the retention of a sequence of magnetically recorded data bits, and further comprises:
a plurality of coils each associated in parallel with corresponding ones of the sequence of magnetically recorded data bits;
a multiplexer for selecting three adjacent ones of said coils at a time;
a set of three capacitors providing for the holding of programming charges addressable through the multiplexer and dischargeable to said three adjacent coils in each of a series of programming cycles; and
a sequencer to advance an address for the multiplexer and ultimately providing for a complete programming of all programmable data bits in the magnetic stripe.

8. A circuit for internally programming data bits beneath a magnetic stripe, comprising:
a longitudinal magnetic stripe disposed on the surface of a substrate and providing for the retention of a sequence of magnetically recorded data bits;
a plurality of coils each associated in parallel with corresponding ones of the sequence of magnetically recorded data bits, and embedded beneath the magnetic stripe;
a multiplexer for selecting three adjacent coils at a time;
a set of three capacitors to hold programming charges that are addressed through the multiplexer and discharged to said three adjacent coils in each programming step; and
a sequencer to advance an address for the multiplexer and ultimately providing for a complete programming of all programmable data bits in the magnetic stripe.

9. A method for programming a sequence of magnetically recorded data bits in a longitudinal magnetic stripe disposed on the surface of a substrate, wherein a plurality of addressable coils are each associated in parallel with corresponding ones of the sequence of magnetically recorded data bits and embedded beneath the magnetic stripe, and a set of three capacitors are used to hold programming charges that are addressed through the multiplexer and discharged into sets of three adjacent coils in each of a series of programming steps.

10. A payment card system, comprising:
a payment card;
a virtual account number generator internal to the payment card;
a user display for online transactions disposed on the payment card;

a magnetic array positioned in a programmable part of a magnetic stripe disposed on the payment card;

a magnetic recording that is a combination of fixed, permanent data bits disposed in said magnetic stripe, and programmable data bits from the magnetic array, and providing for offline transactions with merchant card readers;

wherein, the internal virtual account number generator is able to program the magnetic bits encoded in the magnetic stripe to reflect a latest virtual account number, and the internal virtual account number generator produces a sequence of virtual numbers that can be predicted and approved by an issuing bank, and once a number is used, it is discarded and put on an exclusion list; and wherein, the security level of an unchanging part of the virtual account number represented by said fixed, permanent data bits is increased by including an expiration date field.

* * * * *